G. W. ALDRICH.
Tank for Oil and other Liquid.
No. 220,327.    Patented Oct. 7, 1879.
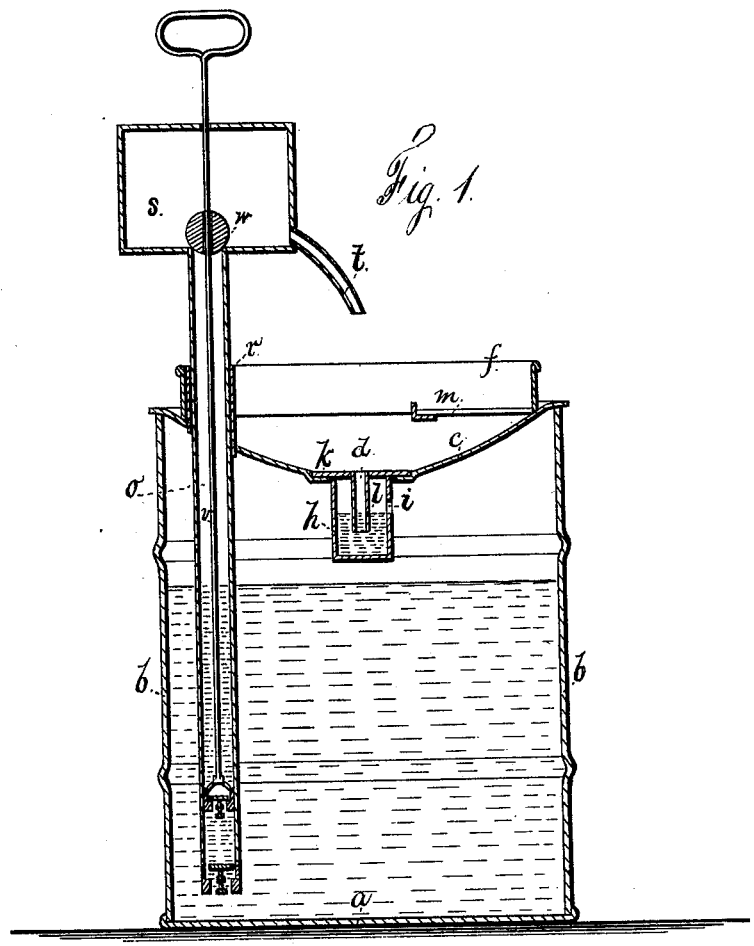

UNITED STATES PATENT OFFICE.

GEORGE W. ALDRICH, OF BROOKLYN, NEW YORK.

IMPROVEMENT IN TANKS FOR OILS AND OTHER LIQUIDS.

Specification forming part of Letters Patent No. 220,327, dated October 7, 1879; application filed March 20, 1879.

*To all whom it may concern:*

Be it known that I, GEORGE W. ALDRICH, of Brooklyn, in the State of New York, have invented an Improvement in Tanks for Oils and other Liquids, of which the following is a specification.

Oil cans, tanks, and holders of various kinds have been made; but they are much more expensive and complicated than the ordinary sheet-metal tank, and hence are not adapted to small retail dealers in coal-oil, turpentine, naphtha, &c.

My present invention is for simplifying the construction of the tank, so that the expense may be but little more than an ordinary tank of the same capacity, and at the same time the escape of vapors will be prevented at the pump and at the return-opening.

I make the top of the tank concave or dishing to an opening at which any overflow-drippings are returned into the tank, at which place I introduce a removable trap for the escape of vapors, and I employ a pump for drawing up the liquid from the tank, and said pump is adapted to prevent the escape of vapors.

In the drawings, Figure 1 is a vertical section of the tank and pump, and Fig. 2 is a plan of the same.

The tank is made of the bottom $a$ and sides $b$, preferably in the form of a vertical cylinder.

The top $c$ is not flat, but dishing downwardly, so that oil or other liquid that may fall upon the top of the can shall run to the lowest part, where there is a hole, $d$.

It is preferable to employ a rim, $f$, around the upper dishing portion of the can, so as to lessen the risk of spilling, especially when the liquid is being allowed to run from a barrel or other vessel into this tank.

The hole $d$ should be large enough for the liquid to flow freely into the tank while being filled, and I make use of a removable trap within this hole to prevent the escape of vapors from the tank. Said trap is in the form of a short cylinder, $h$, closed at the bottom with a hole, $i$, at the side, a cap or cover, $k$, and central hole with a pendent tube, $l$, from the under side of the cap to a point below the hole $i$, so that the liquid remaining in $h$ will close the lower end of the tube $l$ and form a trap. This trap is removable, so as to be taken out when the tank is being filled. It may be made to screw into a female screw that is fastened in the top of the can, or the trap may be of sheet metal and slipped into the opening.

The rack $m$ serves to hold the measures. It may be either movable or a fixture.

The pump $o$ is inserted into a tubular neck, $r$, upon the tank, and said pump has a chamber, $s$, at the upper end and a spout, $t$. These parts and the plunger are of usual construction, with the exception that I place around the plunger-rod $v$ a stopper-ball, $w$, of wood or other light material. This is loose upon the plunger-rod, so that it may be lifted by the liquid as it is drawn up in the pump; but said ball falls when the pumping ceases, and, being of a larger diameter than the bore of the pump, it closes the upper end of the pump-barrel and confines the vapors that might otherwise escape.

I claim as my invention—

A tank for oils and other liquids, having the upper end concave or dishing and a return-hole at the lowest part, in combination with a cylindrical removable trap having a vertical central pipe, substantially as and for the purposes set forth.

Signed by me this 17th day of March, A. D. 1879.

GEORGE W. ALDRICH.

Witnesses:
GEO. T. PINCKNEY,
WILLIAM G. MOTT.